W. A. NALL.
IMPLEMENT FOR DESTROYING INSECTS.
APPLICATION FILED MAR. 22, 1916.

1,282,277.

Patented Oct. 22, 1918.

WITNESSES

INVENTOR
William A. Nall
BY
ATTORNEY

UNITED STATES PATENT OFFICE.

WILLIAM A. NALL, OF LENOX, ALABAMA, ASSIGNOR OF FORTY-FIVE ONE-HUNDREDTHS TO JOSEPH C. LONG, OF REPTON, ALABAMA.

IMPLEMENT FOR DESTROYING INSECTS.

1,282,277. Specification of Letters Patent. Patented Oct. 22, 1918.

Application filed March 22, 1916. Serial No. 85,963.

*To all whom it may concern:*

Be it known that I, WILLIAM A. NALL, a citizen of the United States, residing at Lenox, in the county of Conecuh and State of Alabama, have invented certain new and useful Improvements in Implements for Destroying Insects, of which the following is a specification.

This invention relates to an implement for destroying insects, particularly the boll weevil that is so destructive to cotton plants, and has for its object to provide in such an implement a pair of spaced coupled receptacles for holding oil or other insect destroying fluid, said receptacles being drawn through the field in such relation to each other, as to pass on opposite sides of a row of plants and by means of certain devices carried on the receptacles, the plants are inclined first to one side and then to the other and thoroughly shaken, whereby such insects as may be on the plants are caused to fall into the receptacles and become immersed in the fluid therein are quickly killed.

Another object of the invention is to provide an implement of this kind that shall be simple, cheap and readily repaired when through use certain parts thereof become worn; and furthermore this implement has little weight and can be easily drawn through the field by one man.

With these and other objects in view the invention consists in the novel features of construction, and arrangement of parts, as will be hereinafter more fully described, illustrated in the accompanying drawing, and claimed.

Figure 1:
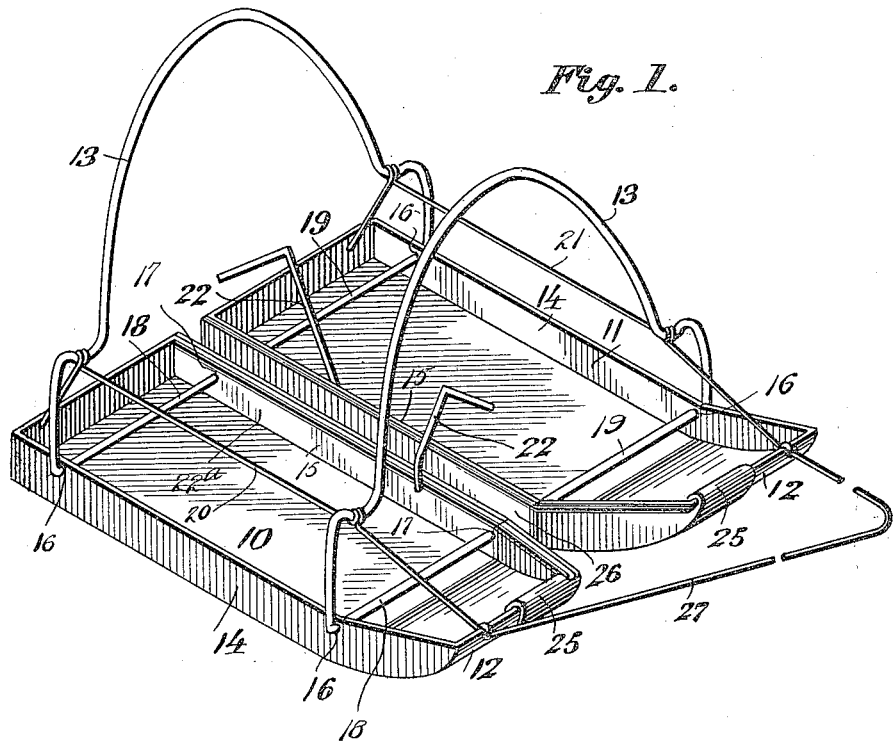
Figure 1 is a perspective view of the complete instrument.
Figure 2:
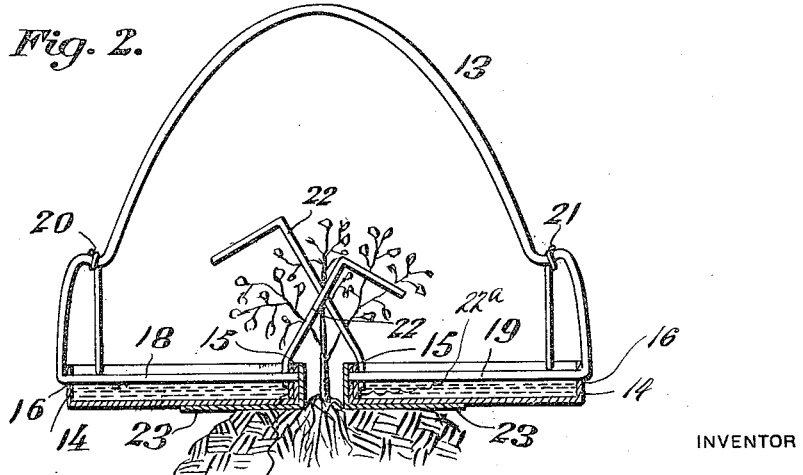
Fig. 2 is a vertical transverse view of the same.

Referring to the drawings by numerals, 10 and 11 indicate two shallow receptacles or pans made preferably of sheet metal and having an upward inclination at their forward ends as at 12 to permit said receptacles from being drawn along the ground and riding easily over the earth and slight obstructions made in the path of travel of the implement. The receptacles or pans 10 and 11 are in parallel relation and spaced apart a distance sufficient to permit implements when drawn through a field to pass therethrough with the pans traveling on opposite sides of a row of plants. The receptacles which are preferably rectangular in shape are fastened together by two or more arched braces 13, one seated near the front and the other near the rear ends of the receptacles. Through the sides 14 and 15 of each of the two receptacles, are formed holes 16 and 17 respectively through which holes horizontal portions 18 and 19 of the braces 13 are passed. These braces 13 stand vertically, the vertical portions being bent at right angles to the horizontal portions 18 and 19 just without the holes 16 in the sides 14 of the receptacles and arch over the spaced passageway therebetween rising to a sufficient height to clear the plants being treated. For supporting the braces 13 in vertical position so as to maintain the two receptacles secured together with sufficient rigidity for the purpose intended wires 20 and 21 extend between and are connected to the braces 13 near the outer sides of the implement, the ends of the wires being carried downward and fastened to the front and rear ends of the respective pans.

Affixed to the inner sides 15 of each receptacle is a finger 22, each finger rising vertically a suitable distance from the side 15 and then inclined at such an angle as to extend across the intervening space between the two receptacles, their inclinations being such that as the implement is drawn along straddling a row of plants these fingers 22 will encounter the upstanding plant and incline the same first to one side and then to the other at the same time, during this inclination of the plant, shaking the same with sufficient severity as to cause any insects which may be on the plant to fall therefrom into the receptacles which for this purpose contain a sufficient quantity of coal oil or other fluid which will kill the insects as soon as they fall thereinto. While only one finger 22 is shown on each receptacle the number may be increased if found desirable or advantageous. A convenient means for mounting the fingers 22 to the inner side 15 of the receptacle is by brazing, soldering or otherwise fastening one end of the desired number of fingers to a plate $22^a$, said finger or fingers projecting from one edge thereof and then placing one of said plates flatwise against the inner face of the side 15 of each receptacle, securing the plates in position in any convenient manner as by the horizontal portions 18 and 19 of the arch braces 13 as clearly shown in the drawings. In case of breakage or other accident to the fingers 22, plates 22ª can be readily removed by disconnecting the portions 18 and 19 of the braces and so remove the plate, substituting a new one in place thereof with the desired number of fingers 22 bent at proper inclination.

Extending longitudinally of each receptacle and on the bottom thereof is a wear plate 23, the forward ends of which are bent over the free ends of each receptacle as at 25 to hold the wear plates in place, the inner ends of the wear plates being bent forward as at 26 to lie against the sides 15 of the receptacle. The wear plates need not extend over more than half the width of the receptacle as the implement when in action rides over the ground close to the row of plants where the earth is hollowed out more or less thus causing the outer sides of the receptacles to be raised from the ground or touch the ground very lightly as it travels through the field. When through use the plates 23 become worn they may be easily disconnected from the pans and new plates substituted therefor.

A loop 27 is connected in any convenient manner to the forward end of each receptacle and forms a draft bar by means of which the implement may be drawn across the field.

From the foregoing description taken in connection with the accompanying drawings, it is thought that the construction and operation of the device will be clearly understood, and while I have shown and described one specific embodiment of my invention, I do not wish to be limited thereto, except for such limitations as the claim may import.

I claim:

An insect destroying implement comprising a pair of shallow fluid-tight receptacles for holding liquid arranged to be drawn along the surface of the ground and in contact therewith, said receptacles being parallel to each other in the same horizontal plane and spaced apart and each upturned at one end, an angle wear plate attached to the bottom and one side of each receptacle, a plurality of arched braces connected to the outer sides of said receptacles for holding them in spaced relation, tie bars or wires extending between said braces and from thence to the front and rear ends of each receptacle for rigidly supporting the braces in vertical position, a removable plate secured against the inner side of each of said receptacles, and an inclined finger secured to each of said plates extending upwardly therefrom and bent at an angle across the intervening space over the adjacent receptacle to engage with and shake the plants being treated for causing insects thereon to fall into the liquid in said receptacles.

In testimony whereof I affix my signature in presence of two witnesses.

WILLIAM A. NALL.

Witnesses:
JAMES J. LEE,
C. E. HART.

Copies of this patent may be obtained for five cents each, by addressing the "Commissioner of Patents, Washington, D. C."